United States Patent
Harper et al.

(10) Patent No.: US 9,758,046 B2
(45) Date of Patent: Sep. 12, 2017

(54) PLUG-IN ELECTRIC VEHICLE (PEV) SMART CHARGING MODULE

(71) Applicant: UChicago Argonne, LLC, Chicago, IL (US)

(72) Inventors: Jason Harper, Plainfield, IL (US); Daniel S. Dobrzynski, Justice, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 140 days.

(21) Appl. No.: 14/549,758

(22) Filed: Nov. 21, 2014

(65) Prior Publication Data
US 2016/0144728 A1  May 26, 2016

(51) Int. Cl.
*H02J 7/00* (2006.01)
*B60L 11/18* (2006.01)

(52) U.S. Cl.
CPC ......... *B60L 11/1803* (2013.01); *Y02E 60/126* (2013.01); *Y02T 10/7005* (2013.01); *Y02T 90/14* (2013.01); *Y02T 90/168* (2013.01); *Y04S 30/12* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| 8,183,826 B2 | 5/2012 | Tuffner et al. |
| 8,830,039 B1 | 9/2014 | Egan |

| 2012/0032636 A1* | 2/2012 | Bianco ................ B60L 3/04 320/109 |
| 2012/0123709 A1 | 5/2012 | Chen et al. |
| 2012/0217928 A1* | 8/2012 | Kulidjian ........... B60L 3/0069 320/109 |
| 2013/0020992 A1 | 1/2013 | Wu et al. |
| 2013/0076123 A1* | 3/2013 | Suzuki ............. B60L 11/1816 307/9.1 |

(Continued)

FOREIGN PATENT DOCUMENTS

| WO | WO2010/132495 A2 | 11/2010 |
| WO | WO2013/070972 A1 | 5/2013 |

OTHER PUBLICATIONS

International Search Report and Written Opinion for Application No. PCT/US2015/061150, mailed Feb. 2, 2016, 9 pages.

(Continued)

*Primary Examiner* — Arun Williams
(74) *Attorney, Agent, or Firm* — Foley & Lardner LLP

(57) ABSTRACT

A smart charging system for charging a plug-in electric vehicle (PEV) includes an electric vehicle supply equipment (EVSE) configured to supply electrical power to the PEV through a smart charging module coupled to the EVSE. The smart charging module comprises an electronic circuitry which includes a processor. The electronic circuitry includes electronic components structured to receive electrical power from the EVSE, and supply the electrical power to the PEV. The electronic circuitry is configured to measure a charging parameter of the PEV. The electronic circuitry is further structured to emulate a pulse width modulated signal generated by the EVSE. The smart charging module can also include a first coupler structured to be removably couple to the EVSE and a second coupler structured to be removably coupled to the PEV.

22 Claims, 5 Drawing Sheets

(56) References Cited

U.S. PATENT DOCUMENTS

2013/0179061 A1 7/2013 Gadh et al.
2013/0300429 A1* 11/2013 Jefferies ............... B60L 3/0069
324/511
2014/0062401 A1 3/2014 Gadh et al.

OTHER PUBLICATIONS

Pratt et al., Electric Vehicle Communications Standards Testing and Validations—Phase II: SAE J2931/1, Department of Energy, Dec. 2012, 28 pages.
Pratt, R., Presentation Entitled: "Vehicle Communications and Charging Control", PNNL, Project No. VSS142, date presented, Jun. 16, 2014, 23 pages.
Kempton, et al., "Vehicle-to-grid Power Fundamentals: Calculating Capacity and Net Revenue", Journal of Power Sources 144 (2005), pp. 268-279.
Lankton, White Paper—"From Smart Charging to Smart Grid, a Case for Intelligent EV Charging Systems", this article was published in the Spring 2013 issue of Utility Horizons Quartlery. http://www.utilityhorizons.com/Quarterly.
Moran, et al., "Curtailment Service Providers: They Bring the Horse to Water . . . Do We Care if It Drinks?", (2010), ACEEE Summer Study on Energy Efficiency in Buildings, pp. 5-287 to 5-298.

* cited by examiner

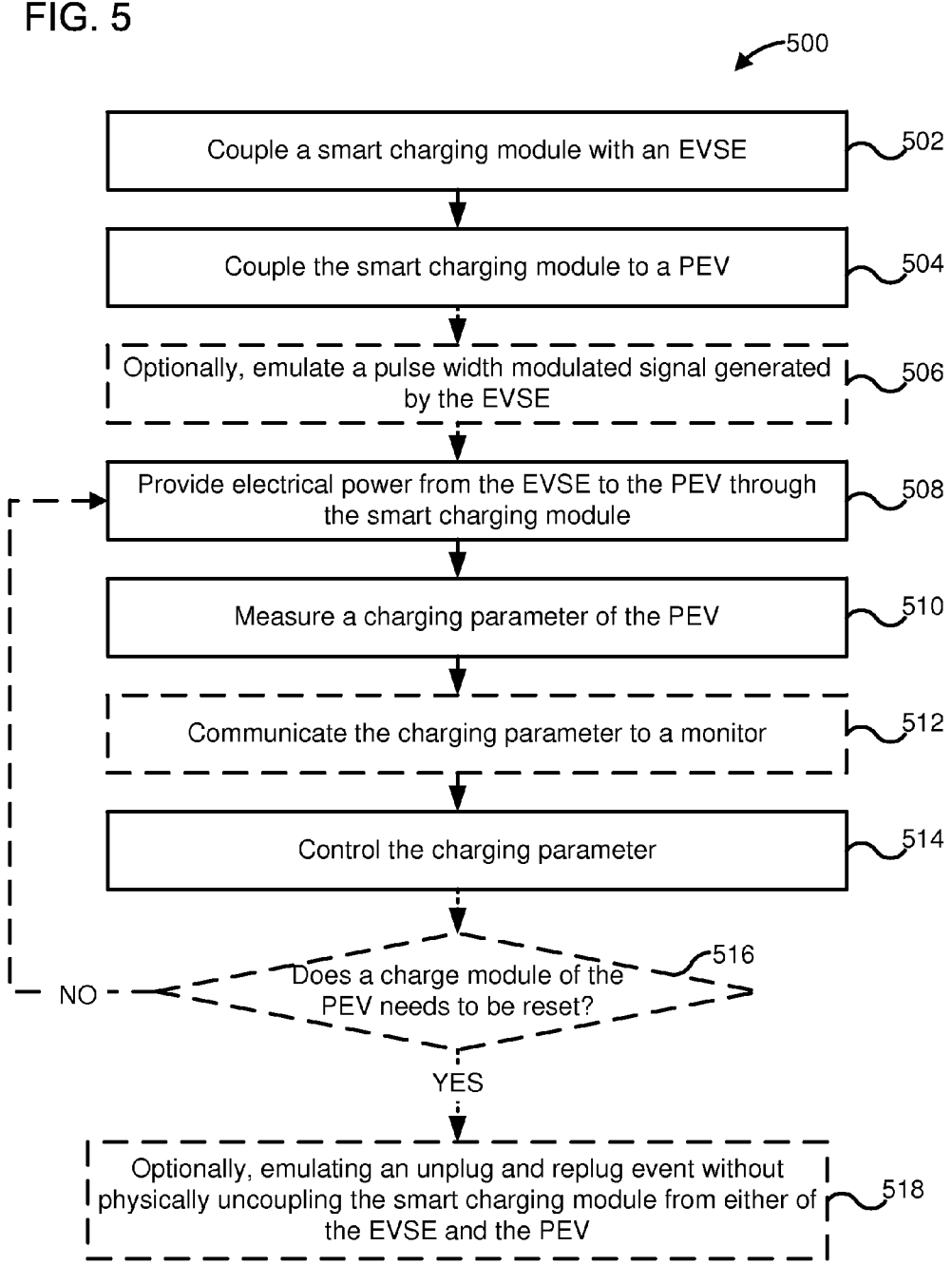

PLUG-IN ELECTRIC VEHICLE (PEV) SMART CHARGING MODULE

The United States Government claims certain rights in this invention pursuant to Agreement/Award No. 24305 by the U.S. Department of Energy and/or pursuant to Contract No. DE-AC02-06CH11357 between the U.S. Department of Energy and UChicago Argonne, LLC, representing Argonne National Laboratory.

TECHNICAL FIELD

The present disclosure relates generally to charging systems for plug-in electric vehicles (PEV).

BACKGROUND

Plug-in electric vehicles (PEV) are a class of vehicles that rely on the use of a rechargeable energy pack to drive or contribute to the drive of a vehicle's power train. PEV refers to a superset of vehicles that include plug-in hybrid electric vehicles (PHEV), battery electric vehicles (BEV), and extended range electric vehicles (EREV). Conventional PEVs are configured to be recharged using an electric vehicle supply equipment (EVSE) when they are at least partially depleted of their charge. The SAE J1772™, IEC 61851-1, and IEC 62196 standards define a common PEV and EVSE conductive charging method including operational, functional and dimensional requirements for the PEV inlet and EVSE mating connector.

Conventional residential and privately owned EVSEs do not have the ability to participate in smart charging programs. SAE J2847/1™ defines PEV smart charging as a system in which the PEV communicates with the power grid in an effort to optimize PEV charging or discharging rate with grid capacity and time of use cost rates. Specifically, smart charging can include the ability of a PEV and utility to communicate in one or more of the following use cases. These can include, for example:

(1) Time of use (TOU): many electrical utilities implement variable pricing programs that vary by time of day, for example peak hours (most expensive) and off-peak hours (less expensive). Enrolling in a TOU program can allow a user to schedule charging of PEVs at the most cost effective times.

(2) Demand response load control programs: In such programs controllers are placed on equipment which allows the utility to control the operation of the equipment during high demand or emergencies, and users receive credits on their energy bill based on the amount of load managed and time of the year.

(3) Real time pricing (RTP): Customers pay electricity supply rates that vary by the hour based on the market price of electricity and customers manage their loads based on the current price of electricity.

(4) Critical peak pricing (CPP): Electrical energy prices are highly inflated during CPP events, and the ability to monitor the CPP period can allow users to schedule and/or manage loads around such times, and (5) Regulation services: These correct for short-term changes in electricity use that might affect the stability of the power grid. By managing the grid's load and matching the grid's generation, grid resiliency is maintained.

Conventional PEVs and EVSEs do no not include smart charging capabilities and are not configured to optimize or guide a user in optimizing the charging of the PEV to minimize electricity costs. This translates into a substantial loss to the user and utility in terms of cost savings which could have been achieved if the PEV and/or EVSE were configured for smart charging.

SUMMARY

Embodiments described herein generally relate to PEVs and in particular to smart charging modules for PEVs that can measure a charging parameter of the PEV.

In some embodiments, a smart charging system for charging a plug-in electric vehicle (PEV) includes an electric vehicle supply equipment (EVSE) configured to supply electrical power to the PEV through a smart charging module electrically coupled to the EVSE. The smart charging module comprises an electronic circuitry which includes a processor. The electronic circuitry includes electronic components structured to receive electrical power from the EVSE, and supply the electrical power to the PEV. The electronic circuitry is configured to measure a charging parameter of the PEV. In some embodiments, the charging parameter can include a charging status, a charge rate, and a physical connectivity status and the electronic circuitry can be configured to perform at least one of a start, stop, increase, or reduction of the charge rate. In particular embodiments, the smart charging module can include a first coupler structured to be removably coupled to the EVSE. The smart charging module can also include a second coupler structured to be removably coupled to the PEV.

In some embodiments, a smart charging module for a PEV includes a first coupler, a second coupler, an electronic circuitry, and a communications module. The first coupler is structured to be removably coupled to an EVSE. The second coupler is structured to be removably coupled to the PEV. The electronic circuitry includes a processor, and is electrically coupled to the first coupler and the second coupler. The electronic circuitry includes electronic components structured to receive electrical power from the EVSE via the first coupler, and supply the electrical power to the PEV via the second coupler. The electronic circuitry is configured to measure and/or control a charging parameter of a charge session of the PEV.

In particular embodiments, the charging parameter can include a charging status, a charge rate, and a physical connectivity status and the electronic circuitry can be configured to at least perform one of a start, stop, increase or reduction of the charge rate. In other embodiments, the smart charging module can also include a communications module configured to allow two way communication between the processor and an external monitor. In such embodiments, the external monitor can be configured to at least control one a charging status or charging rate of the PEV.

In some embodiments, a method for charging a PEV includes coupling a smart charging module with an EVSE, and to the PEV. Electrical power is provided from the EVSE to the PEV through the smart charging module. A charging parameter of the PEV is measured, which can include at least one of a charging status, a charge rate, and a physical connectivity status of the PEV. The method also includes controlling the charging parameter. In some embodiments, the method also includes emulating a pulse width modulated (pwm) signal generated by the EVSE. In some embodiments, the method can also include emulating an unplug-replug event without physically uncoupling the smart charging module from either of the EVSE or the PEV to reset the PEV.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 5 shows a schematic flow diagram of a method for charging a PEV, according to an embodiment.

Figure 1:
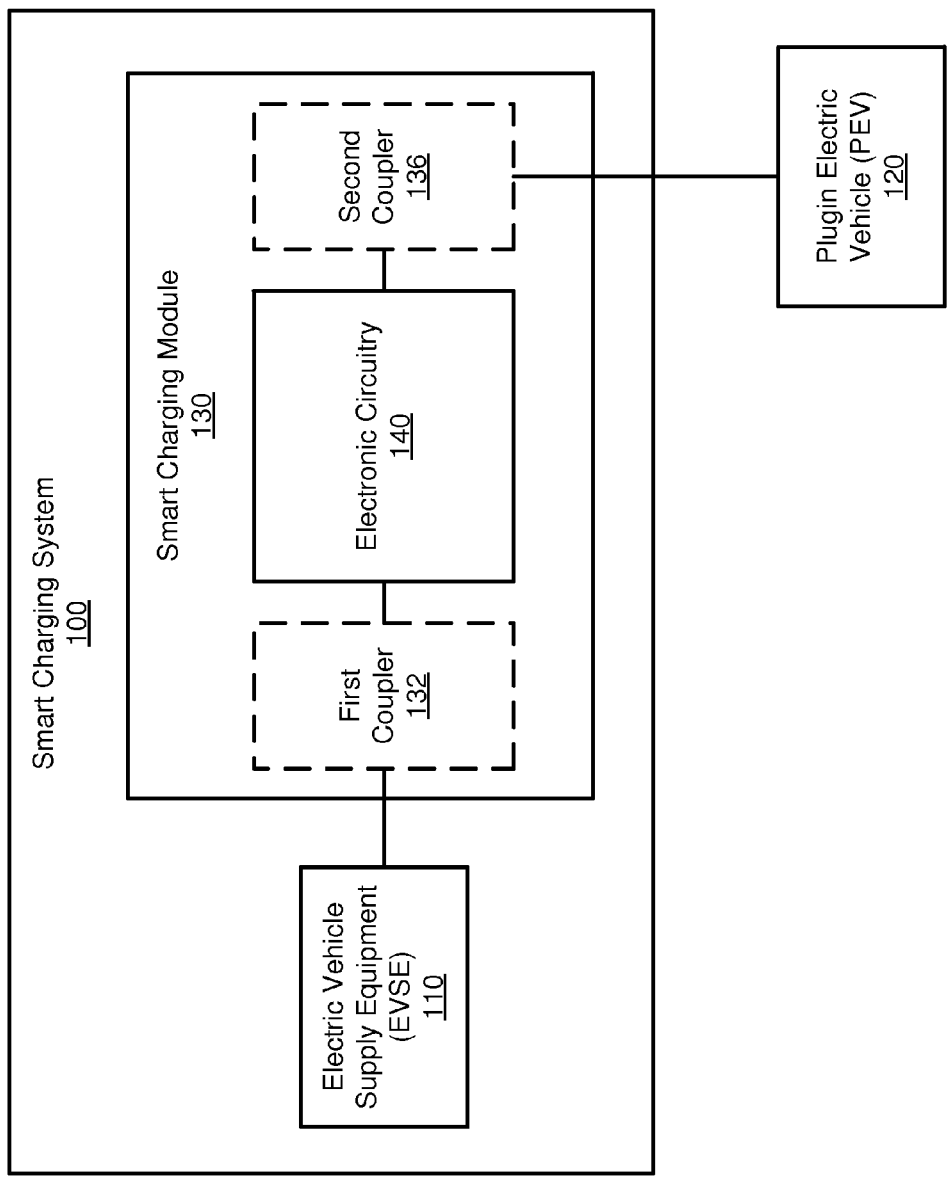
FIG. 1 is a schematic block diagram of a smart charging system that includes a smart charging module, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to PEVs and in particular to smart charging modules for PEVs that can measure a charging parameter of the PEVs. Embodiments of the smart charging module described herein provide several benefits including, for example: (1) providing SAE J1772™ couplers allowing compatibility with existing PEV inlets and EVSE outlets; (2) emulating the PEV and the EVSE such that neither the PEV nor the EVSE can identify that a smart charging module is electrically coupled to each one of them allowing for flow of electrical power from the EVSE to the PEV without any interruptions; (3) measuring a plurality of charge parameters of the PEV including a charge status, a charge rate, and a physical connectivity status; (4) communicating the charge parameter information to an external monitor for monitoring and/or control of the charging parameters; (5) providing control of the charge parameters to start/stop, and/or increase/reduce charge rate; and (6) enabling communication with current and future smart grid protocols thereby allowing participation of the PEV in smart grid programs.

FIG. 1 shows a schematic block diagram of a smart charging system 100, according to an embodiment. The smart charging system 100 includes an electric vehicle supply equipment (EVSE) 110 configured to supply electrical power to a plug-in electric vehicle (PEV) 120, and a smart charging module 130. The PEV 120 can include any suitable PEV such as, for example, a PHEV, BEV, or an EREV. Furthermore, the PEV 120 can include an electrical inlet, for example, a SAE J1772™ female coupler (IEC 62196-2 Type 1), IEC 62196-2 Type 2 female coupler, IEC 62196-2 Type 3 female coupler GB/T Part 2 female coupler, or any other suitable coupler for both AC or DC charging (IEC 62196-3 CCS, SAE J1772™ CCS, GB/T Part 3, CHAdeMO, Tesla, etc.). The PEV 120 can include a rechargeable battery pack configured to receive the electrical power from the EVSE 110, and provide the power to one or more electric motors and/or electronic equipment included in the PEV 120.

The EVSE 110 is configured to supply electrical power to the PEV 120. For example, the EVSE 120 can be coupled to a power source, for example, a power grid, or a power generation unit configured to generate electrical power suitable for supplying to the PEV 120, for example, a 120 VAC, 208 VAC, 240 VAC, or 480 VAC 50/60 Hz, single or three-phase power source. In addition to EVSE 110 supplying AC power to PEV 120, EVSE 110 may supply DC power, for example 500 VDC, 200 ADC to PEV 120. Furthermore, the EVSE 110 can include any suitable electronic circuitry, for example, rectifiers, resistors, capacitors, transformers, voltage dividers, a processor or any other suitable electronics for controlling the power supplied to the PEV 120.

The EVSE 110 includes an electrical outlet configured to be coupled to the electrical inlet of the PEV 120. For example, the electrical outlet can include a SAE J1772™ male coupler configured to be coupled to a female SAE J1772™ coupler of the PEV 120. In other embodiments, the EVSE 110 and PEV 120 can include any other coupler such as, for example, the IEC 62196-2 Type 1, IEC 62196-2 Type 2, IEC 62196-2 Type 3, GB/T Part 2, or any other suitable coupler for both AC or DC charging (IEC 62196-3 CCS, SAE J1772™ CCS, GB/T Part 3, CHAdeMO, Tesla, etc.).

The smart charging module 130 is electrically coupled to the EVSE and includes an electronic circuitry 140. In some embodiments, the electronic circuitry 140 can be integrated, for example, retrofitted into the EVSE 110. In other embodiments, the smart charging module 130 can include a first coupler 132 and a second coupler 136. In such embodiments, the electronic circuitry 140 is electrically coupled to the first coupler 132 and the second coupler 136. The first coupler 132 is structured to be removably coupled to the EVSE 110. For example, the first coupler 132 can include a female SAE J1772™ coupler structured to be removably coupled to a male SAE J1772™ coupler of the EVSE 110.

The second coupler 136 is structured to be removably coupled to the PEV 120. For example, the second coupler 136 can include a male SAE J1772™ coupler structured to be removably coupled to a female SAE J1772™ coupler of the PEV 120. In other embodiments, the first coupler 132 and second coupler 136 can include the IEC 62196-2 Type 1, IEC 62196-2 Type 2, IEC 62196-2 Type 3, GB/T Part 2, or any other suitable coupler for both AC or DC charging (IEC 62196-3 CCS, SAE J1772™ CCS, GB/T Part 3, CHAdeMO, Tesla, etc.).

The electronic circuitry 140 includes a processor (not shown). The electronic circuitry 140 includes electronic components structured to receive electrical power from the EVSE 110, and supply the electrical power to the PEV 120. In particular embodiments, the electronic circuitry 140 can electrically be coupled to the first coupler 132 and the second coupler 136. In such embodiments, the electronic components can receive electrical power from the EVSE 110 via the first coupler 136, and supply the electrical power to the PEV 120 via the second coupler 136.

The electronic circuitry 140 is configured to measure and/or control a charge parameter of the PEV 120. The charge parameter can include, for example, a charging status, a charge rate, a physical connectivity status, or any other charging parameter of the PEV 120. Moreover, the electronic circuitry 140 can be further configured to perform at least one of a start, stop, increase or reduction of the charge rate.

Furthermore, the electronic circuitry 140 is further structured to emulate a pulse width modulated signal generated by the EVSE. For example, the electronic circuitry 140 can include a pilot driver circuit electrically coupled to the processor. The pilot driver circuit can be structured to replicate a pulse width modulated signal generated by the EVSE 110 such that when the PEV 120 is electrically coupled to the EVSE 110 via the smart charging module 130, the PEV 120 is "tricked" into believing that it is directly coupled to the EVSE 110. The pilot driver circuit can receive instructions from the processor to control the pulse width modulated signal to control the charging parameter (e.g., reduce, increase, or otherwise start/stop the signal, thereby controlling the charge rate).

The processor can include any suitable microcontroller, for example, a programmable logic controller (PLC), an ASIC chip, or any other suitable processor. The processor can be in communication with one or more sensors and/or drivers included in the electronic circuitry 140. The processor can be configured to execute instructions, for example, instructions stored on a computer readable medium (e.g., a memory such as a RAM, ROM, or solid state memory) included in the smart charging module 130. In this manner, the processor can be configured to measure the charging parameter of the PEV 120, as described herein. Furthermore, the processor can be configured to control the charging parameter or otherwise a charge session of the PEV 120 based on instructions stored on the computer readable medium, or received from an external monitor, as described herein. For example, the processor can be configured to start/stop and/or increase/reduce a charge rate of the PEV 120.

In some embodiments, the smart charging module 130 can include a rechargeable power source (not shown), for example, a Li-ion battery, a Ni-Cad battery, or any other suitable rechargeable power source. In such embodiments, the electronic circuitry 140 can include a charge circuit to charge the power source using electrical power from the EVSE 110 during a charge session of the PEV 120. Furthermore, the electronic circuitry 140 can include a supply circuit to supply electrical power from the power source to various components of the electronic circuitry 140 when the smart charging module 130 is uncoupled from the EVSE 110. The power source can, for example, allow the smart charging module 130 to broadcast status messages when not charging the PEV 120. Such messages can be broadcast to an external monitor via a communications module included in the smart charging module 130, as described herein, or on a display (not shown) disposed on a housing of the smart charging module 130. The processor can be configured to maintain the smart charging module 130 in a sleep mode a majority of the time when not coupled with the EVSE 110 to conserve the electrical power stored by the power source.

The electronic circuitry 140 can also include electronics components such as, for example, resistors, diodes, capacitors, switches, etc. to perform a desired operation. For example, the electronic circuitry 140 can include electronic components structured to allow the processor to determine when an EVSE is coupled to the smart charging module 140. Furthermore, the electronic circuitry 140 can be structured to emulate the circuitry in the PEV 120 which signals the EVSE 110 to open or close its contacts or otherwise start or stop the charging session. The electronic circuitry 140 can also include components, for example, switches structured to electrically uncouple the EVSE 110 from the PEV 120 without uncoupling the EVSE 110 form the smart charging module 130 (e.g., by "tricking" the EVSE 110 into believing it is not coupled to the PEV 120).

In some embodiments, the electronic circuitry 140 can be structure to emulate to emulate an unplug (i.e., uncoupling) and replug (i.e., coupling) event without physically uncoupling the smart charging module 130 from either of the EVSE 110 and the PEV 120. This is beneficial because in some cases, the PEV 120 can require an unplug-replug (e.g., uncoupling and recoupling) of the EVSE 110 in order to reset a charge module or other onboard state machine of the PEV 120 and restart a charge session. In addition, the electronic circuitry 140 can be configured to prevent a user from driving away while the PEV 120 is still physically coupled to the EVSE 110.

In this manner, the smart charging module 130 can be configured to emulate not only an unplug-replug event without user intervention, but also monitor if the PEV 120 is awake or asleep. In such embodiments, the electronic circuitry 140 can also be structured to incorporate transaction control in the EVSE 110 to allow credit card or contract payment transactions to be performed via the smart charging module 130. In some embodiments, the electronic circuitry 140 can also be configured to electrically isolate the PEV 120 from the EVSE 110 when a charging session is complete.

In some embodiments, the smart charging module 130 can also include an electric meter for measuring electrical power and electrical energy supplied to the PEV 120 via the smart charging module 130. The electric meter can be, for example a revenue grade electric meter including electronic components (e.g., sensors and instrumentation) configured to measure the electrical power and electrical energy provided by the EVSE 110 in real time, and/or track power and energy usage over a period of time (e.g., from initial charge of the PEV 120 battery).

In some embodiments, the smart charging module 130 can also include a communications module. The communications module can be in two way communication with the processor and an external monitor, for example, a smart phone app, tablet app, a remote server, a cloud serve, an onboard computer, etc., and configured to communicate the charging parameter to the external monitor. The communications module can be configured to communicate with the external monitor using wireless or wired communication. For example, the communications module can communicate with the external monitor using BLUETOOTH®, low powered BLUETOOTH®, Wi-Fi, cellular data service, or any other means of wireless communication. The monitor can be configured to communicate instructions to the processor via the communications module, for example, to control the charging parameter. For example, the external monitor can communicate instructions to increase or decrease the charge rate, update firmware, set preferences and/or options for the smart charging module 130. Furthermore, the user can use the external monitor to start or stop a PEV charging session remotely, and increase or decrease the charge rate remotely.

In some embodiments, the smart charging module 130 can also include a power line communication module configured to allow communication to and/or from the smart charging module 130 (e.g., the processor included in the smart charging module 130) via the existing power line infrastructure. In such embodiments, the power line communications module can allow the smart charging module 130 (e.g., the processor of the smart charging module 130) to communicate with current and future smart grid protocols such as SEP 1.X, SEP 2.0, OpenADR, ISO 15118, OCPP, ICCP, DNP3, or any other smart grid communication protocol. This can allow the smart charging system 100 to participate in various smart grid programs in combination with the information provided by the smart grade electric meter.

In some embodiments, the smart charging module 130 can be integrated, for example, retrofitted in the EVSE 110. In other embodiments, the smart charging module 130 can be a standalone components structured to be coupled to each of the EVSE 110 and the PEV 120 (e.g., via the first coupler 132 and the second coupler 136 respectively). In such embodiments, the smart charging module 130 can have a compact form factor which allows portability such that a user can use the smart charging module 130 at home or with publicly placed EVSE (e.g., at an EVSE station). In some embodiments, the smart charging module 130 can be integrated with the EVSE 110, for example, fixedly coupled to the EVSE 110, or disposed in a housing of the EVSE 110.

As described herein, the smart charging system 100 can provide numerous benefits including, for example: (1) monitoring the current charge status and instantaneous charge rate of the PEV 120; (2) remotely control a PEV 120 charging session to start or stop a charge session, and increase or decrease the charge rate; (3) enable participation in smart charging programs through the external monitor (e.g., third party monitors such as electric utility providers) which may include time of use pricing, direct load control programs, real time pricing, critical peak pricing, optimized energy transfer, frequency regulation services, or any other smart grid program or a combination thereof; (4) using global positioning system (GPS) information obtained from a GPS included in the smart charging module 130, an external monitor GPS (e.g., a smart phone GPS), a PEV 120 GPS, etc. to determine the electrical utility region where a charge session is being performed; (5) simulating a coupling/uncoupling event so that the PEV 120 does not have to be physically uncoupled from the EVSE 110 to restart a failed charge session; and (6) enabling employers to monitor employee energy usage and bill the employees for the electrical power usage based on actual energy usage, rather than a flat rate which can be higher than the actual energy used.

As described herein, in some embodiments, the smart charging module 130 can be integrated with the EVSE 110. Such embodiments can also provide numerous benefits including, for example: (1) allowing EVSE owners to monitor and control a plurality of EVSEs from a single interface regardless of EVSE type; (2) using the smart charging module 130 integrated in the EVSE to create a system of access control, for example, allowing users to enable an EVSE using a mobile app or web-based server to communicate with the smart charging module 130; (3) determining the specific EVSE 110 that the user is accessing to charge the PEV 120 at an EVSE station that includes a plurality of EVSEs, using the smart charging module 130; (4) using the revenue grade electric meter and external monitor (e.g., a smart phone app) to incorporate transaction control in the EVSE 110 to allow credit cards or contract payment transactions to be performed via the smart charging module 130; (5) allowing integration into existing building or local energy management systems in order to provide real-time energy information as well as provide charge control to the management system; (6) allowing participation in smart grid programs, for example, any of the smart grid programs described herein; (7) allowing the user to monitor and control a charging session using the external monitor (e.g., a smart phone app); (8) enabling users to find and/or reserve available EVSE modules at an EVSE station; (9) simulate an unplug-replug of the EVSE 110 with the PEV 120 to restart a failed charge session, without physically uncoupling the smart charging module 130 from either the EVSE 110 or the PEV 120.

Having described above various general principles, several exemplary embodiments of these concepts are now described. These embodiments are only examples and many other configurations of a smart charging module, systems and methods are contemplated.

Figure 2:
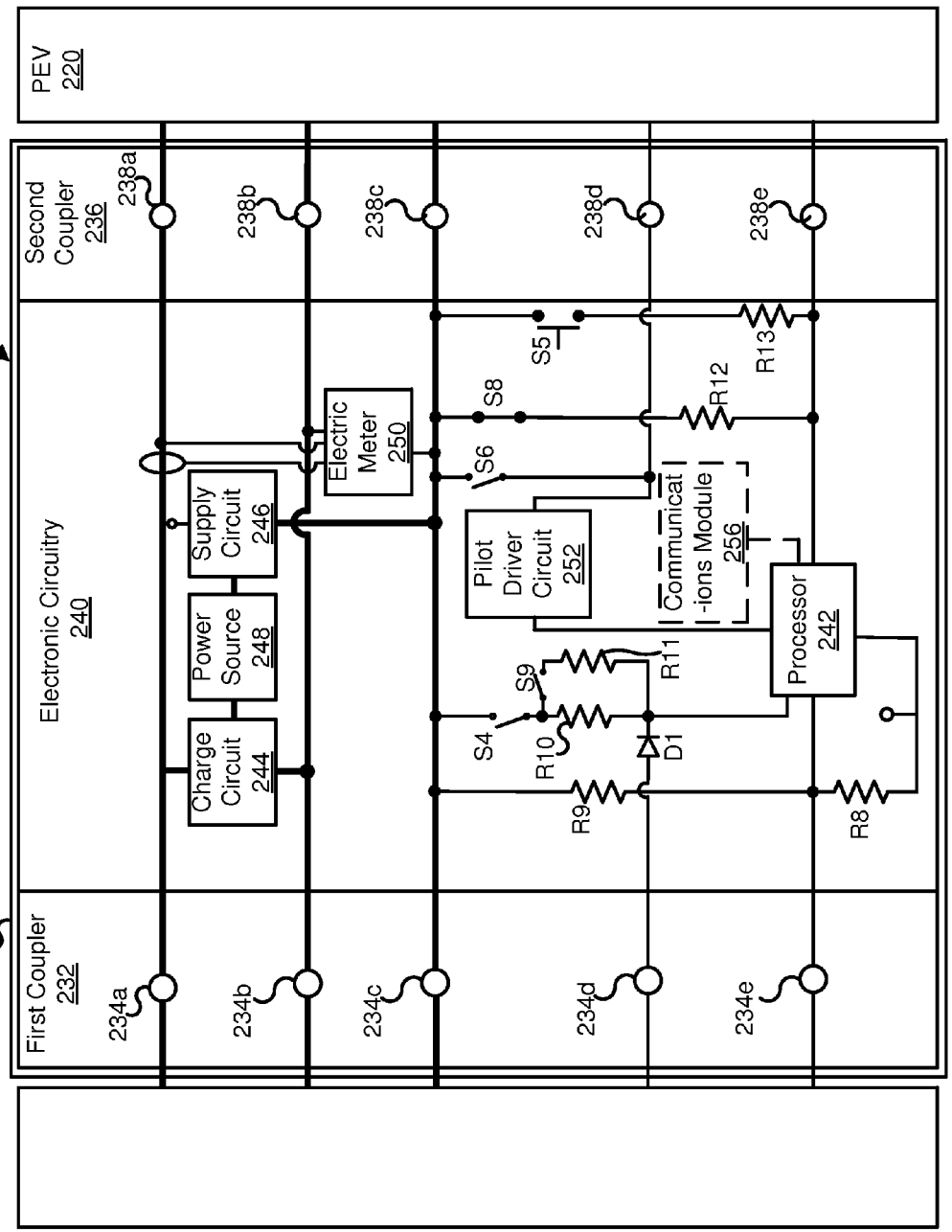
FIG. 2 is a block diagram of a smart charging module showing a circuit diagram of an electronic circuitry included in the smart charging module which includes a power source, according to one embodiment.

FIG. 2 is a block diagram of a smart charging module 230 showing a circuit diagram of the electronic components included in the smart charging module 230. The smart charging module 230 can be included in a smart charging system, for example, the smart charging system 100. The smart charging module 230 includes a first coupler 232, a second coupler 236, and electronic circuitry 240. The smart charging module 230 is configured to be a standalone module which can be removably coupled to an EVSE 210 and a PEV 220 to provide smart charging capabilities, as described herein. The EVSE 210 and the PEV 220 can be substantially similar to the EVSE 110 and PEV 120 described with respect to the system 100, and are therefore, not described in further detail herein.

The smart charging module 230 includes a housing 231 defining an internal volume. The first coupler 232, the second coupler 236, and the electronic circuitry 240 are disposed within the internal volume defined by the housing 231. The housing 231 can be made from a strong and rigid material, for example, plastics or metals. Furthermore, the housing 231 can include any suitable coupling mechanism such as notches, grooves, indents, detents, latches, magnets, or any other mechanism to facilitate coupling of the smart charging module 230 with the EVSE 210 and the PEV 220.

The first coupler 232 is structured to be removably coupled to the EVSE 210. The first coupler 232 includes a first pin 234a, a second pin 234b, a third pin 234c, a fourth pin 234d, and a fifth pin 234e (collectively referred to herein as the "first coupler pins 234") configured to mate with corresponding pins included in an outlet or otherwise coupler of the EVSE 210. In some embodiments, the first coupler 232 can include a female SAE J1772™ coupler configured to be removably coupled to a male SAE J1772™ coupler of the EVSE 210. In other embodiments, the first coupler 232 can include the IEC 62196-2 Type 1, IEC 62196-2 Type 2, IEC 62196-2 Type 3, GB/T Part 2, or any other suitable coupler for both AC or DC charging (IEC 62196-3 CCS, SAE J1772™ CCS, GB/T Part 3, CHAdeMO, Tesla, etc.). While shown as including the five first coupler pins 234, in other embodiments, the first coupler 232 can include any number of pins, for example, 2, 3, 4, 6 or even more such that the first coupler 232 can interface with any suitable EVSE coupler, as described herein.

The second coupler 236 is structured to removably coupled to the PEV 220. The second coupler 236 includes a first pin 238a, a second pin 238b, a third pin 238c, a fourth pin 238d, and a fifth pin 238e (collectively referred to herein as the "second coupler pins 234") configured to mate with corresponding pins included in an inlet or otherwise coupler of the PEV 220. In some embodiments, the second coupler 236 can include a male SAE J1772™ coupler configured to be removably coupled to a female SAE J1772™ coupler of the PEV 220. In other embodiments, the first coupler 236 can include the IEC 62196-2 Type 1, IEC 62196-2 Type 2, IEC 62196-2 Type 3, GB/T Part 2, or any other suitable coupler for both AC or DC charging (IEC 62196-3 CCS, SAE J1772™ CCS, GB/T Part 3, CHAdeMO, Tesla, etc.). While shown as including the five second coupler pins 238, in other embodiments, the second coupler 236 can include any number of pins, for example, 2, 3, 4, 6 or even more such that the second coupler 236 can interface with any suitable EVSE coupler, as described herein.

The electronic circuitry 230 includes a processor 242 and is electrically coupled to the first coupler 232 and the second coupler 236. The electronic circuitry 240 includes electronic components structured to receive electrical power from the EVSE 210 via the first coupler 232 and supply the electrical power to the PEV 220 via the second coupler 236.

The electronic circuitry 240 includes a power source 248, a charge circuit 244 and a supply circuit 246 electrically coupled to the power source 248, an electric meter 250, a pilot driver circuit 252, and optionally, a communications module 256. As shown in FIG. 2, the electronic circuitry 240 is electrically coupled to the first coupler pins 234, and the second coupler pins 238. In this manner, the electronic circuitry 240 is configured to receive electrical power from the EVSE 210 via the first coupler 232, and supply the electrical power to the PEV 220 via the second coupler 236. The electronic circuitry 240 is configured to measure and/or control a charging parameter of a charge session of the PEV 220. The charging parameter can include a charging status, a charging rate and a physical connectivity status of the PEV 220, as described herein. Moreover, the electronic circuitry 240 can be configured to start/stop and/or increase/reduce the charge rate.

The processor 242 is configured to interface with one or more sensors and/or drivers included in the electronic circuitry 240. The processor 242 is in electrical communication with the communications module 256, the pilot driver circuit 252, the electric meter 250, and the power source 248 via the supply circuit 246. The processor 242 can be configured to execute instructions, for example, instructions stored on a computer readable medium (e.g., a memory such as a RAM, a ROM or a solid state memory) included in the smart charging module 230.

The processor 242 can be configured to measure the charging parameter of the electrical power (e.g., charge rate, voltage, current, etc.) provided by the EVSE 210, and/or control the electrical power provided to the PEV 220 (e.g., start, stop, increase, or reduce the charge rate). In this manner, the processor 242 can be configured to control the charging parameter or otherwise a charging session of the PEV 220 based on instructions stored on the computer readable medium, or information obtained from the electric meter 250, or an external, monitor as described herein.

In some embodiments, the smart charging module 230 can also include a power line communications module (not shown) configured to allow communication with a smart grid. For example, the power line communications module can be electrically coupled to the processor 242 to allow the processor to communicate and/or receive information from the smart grid via existing power line infrastructure. In such embodiments, the power line communications module can include instructions to allow communication with current or future smart grid protocols such as, SEP 1.X, SEP 2.0, OpenADR, ISO 15118, OCPP, ICCP, DNP3, or any other current or future smart grid protocol. This can allow the smart charging module 230 and thereby, the PEV 220 to participate in various smart grid programs in combination with the information provided by the revenue grade electric meter 250. Furthermore, this can also allow one or more external monitors to monitor the charge status and/or charge rate of the PEV 220 and provide remote control of the charge session.

In some embodiments, a power line communication adapter (e.g., a HomePlug Green PHY™ power line communication adapter) can be integrated with the smart charging module 230. The adapter can, for example, be paired with a bi-directional converter (onboard PEV 220 or off-board PEV 220) to perform AC or DC charging/discharging. Furthermore, the adapter can also be configured to allow reverse flow from the PEV 220 to the EVSE 210, for example, to allow any charge stored in the PEV 220 battery to be supplied (discharged) back to the source (e.g., the grid) via the EVSE 210. Electric meter 250 could be configured to allow net metering, in which the electric meter 250 measures both forward and reverse energy flow between the EVSE 210 and PEV 220 and the user receives a credit for the energy fed back to the grid.

The power source 248 can include any rechargeable power source for example, a Li-ion or a Ni-Cad battery. The charge circuit 244 is electrically coupled to the power source 248 and configured to route electrical power from the EVSE 210 to the power source 248, to charge the power source 248. For example, the charge circuit 244 can be configured to charge the power source 248 when the PEV 220 is charging and an AC or DC voltage from the EVSE 210 is available on the first pin 234a and the second pin 234b included in the first coupler 232.

The supply circuit 246 is also electrically coupled to the power source 248 and configured to supply electrical power from the power source 248 to the other components of the electronic circuitry 240 when the EVSE 210 is uncoupled from the first coupler 232. For example, the power source 240 can be configured to provide power to the communications module 256 for broadcasting status messages (e.g., via an external monitor, or a display included in the smart charging module 230), when the smart charging module 230 is not coupled to the EVSE 210. Furthermore, the processor 242 can be configured to maintain the smart charging module 230 in a sleep or otherwise standby state when not connected to the EVSE 210 and thereby, not charging in order to conserve and extend battery life.

The electric meter 250 can be a revenue grade electric meter for measuring electrical power and electrical energy supplied to the PEV 220 via the smart charging module 230, for example, to allow participation in smart grid programs, as described herein. This information can be used to determine power usage, energy provided, and/or determine energy cost (e.g., based on real time pricing information), etc. In some embodiments, the electric meter 250 can be used in combination with the communications module 256 to provide smart charging capabilities, and/or incorporate transactional control in the smart charging module 230, for example, to allow credit card or contract transactions to be performed via the smart charging module 230.

The pilot driver circuit 252 is electrically coupled to the processor 242. The pilot driver circuit 252 is configured to emulate the pulse width modulated (pwm) signal communicated by the EVSE 210 such that the PEV 220 believes it is coupled directly to the EVSE 210, when it is actually coupled to the EVSE 210 via the smart charging module 230. For example, the pilot driver circuit 252 can be structured to mimic a pulse width modulated (pwm) signal generated by the EVSE 210. If a lower charge rate is needed, the pwm duty cycle can be reduced by the pilot driver circuit 252 to reduce the charge rate. For example, the pilot driver circuit 252 can be configured to receive instructions from the processor 242 to control the pwm signal to reduce, increase, or otherwise stop/start the pwm signal, thereby controlling the charge rate.

The communications module 256 can optionally, be included in the smart charging module 230. The communications module 256 can be in two way communication with the processor 242, and an external monitor (e.g., a smart phone app, a tablet app, a remote server, a cloud server, an onboard computer, etc.) which can be configured to control a charging parameter. For example, the communications module 256 can be configured to receive information on a charge rate, charge status, and or physical connectivity status from the processor 242 and communicate this information to the external monitor. The monitor can then analyze the information, and communicate instructions to the processor 242 to vary one or more of the charging parameters and thus, control the charge session.

The external monitor can also be in communication with a smart grid or otherwise participating in smart grid programs. The external monitor can thus use smart grid information to optimize the charging session, for example, to minimize the cost of charging the PEV 220. Moreover, the communications module 256 can be configured to communicate any other instructions or firmware updates to the electronic circuitry 240. The communications module 256 can be configured to communicate with the external monitor using wired (e.g., USB®, FireWire®, power line communication, RS-232, RS-486, etc.) or wireless communication (e.g., BLUETOOTH®, low-powered BLUETOOTH®, Wi-Fi, cellular data service, ZigBee, etc.).

The electronic circuitry 240 allows for the smart charging module 230 to be coupled to either the EVSE 210 or the PEV 220 first. The electronic circuitry 240 also includes resistors, diodes, and switches arranged in a suitable configuration to allow the smart charging module 230 to perform a desired monitoring and/or control function.

As shown in the circuit diagram of the electronic circuitry 240 in FIG. 2, resistors R8 and R9 are electrically coupled to the processor 242 and allow the processor 242 to determine when the EVSE 210 is coupled to the smart charging module 230 via the first coupler 232. The electronic circuitry 240 also includes a diode D1, and resistors R10 and R11. The diode D1, and the resistors R10 and R11 are configured to emulate the circuitry in the PEV 220 urging the EVSE 210 to close or open it's contactors via switch S9 included in the electronic circuitry 240. A switch S4 is also included in the electronic circuitry 240 which allows the electronic circuitry 240 to electrically uncouple the diode D1, and the resistors R10 and R11 from the EVSE 210 pilot driver circuit and "trick" the EVSE 210 into believing it is not connected to the PEV 220 without physically uncoupling the EVSE 210 from the smart charging module 230.

The electronic circuitry 240 also includes a normally open switch S5 (e.g., a push switch) electrically coupled in series with a resistor R13. Another resistor R12 is electrically coupled to the resistor R13 and the switch S5 in parallel, and is grounded via a normally closed switch S8. This layout is configured to prevent a user of PEV 220 to drive away while the smart charging module 230 and the EVSE 210 are still coupled to the PEV 220. This is because the PEV 220 is able to detect that the EVSE 210 is coupled to PEV 220 even if electrical power is lost from the EVSE 210 to the smart charging module 230. In other words, the electronic circuitry 240 is configured to detect that the EVSE 210 is physically coupled to the PEV 220 even when the PEV 220 is electrically isolated from the EVSE 210.

In some embodiments, the electronic circuitry 240 can be configured to emulate an unplug-replug event without physically uncoupling the smart charging module 230 from either of the EVSE 210 and the PEV 220. In such embodiments, the electronic circuitry 240 is configured to emulate an EVSE 210 unplug event by opening switch S8 and closing switch S6. This is particularly beneficial as some PEVs require an unplug-replug of the EVSE 210 coupler (or otherwise connector) in order to reset their charge module's onboard state machine and restart a charge session (e.g., if power was lost during a charge session).

Furthermore, some PEVs have been known to fall asleep (e.g., enter a standby mode) if a user is not fast enough in providing the EVSE 210 payment information. In such instances, an unplug-replug of the EVSE 210 coupler can be required to wake the PEV 220. As described herein, the electronic circuitry 240 is configured to emulate the unplug-replug event without user intervention and without needing to physically uncouple the EVSE 210 from the smart charging module 230. Furthermore, the electronic circuitry is also structured to monitor if the PEV 220 is awake or asleep by monitoring electrical communication from the fifth pin 238e included in the second coupler 236. This can be particularly beneficial during periods of grid blackouts in which the smart charging module 230 can determine when the grid is back online, wake the PEV 220 and continue the charge session.

Switch S6 is configured to turn off the pilot driver circuit 252 when a charge session is complete. In some instances, the PEV 220 can be left electrically coupled to the EVSE 210 for prolonged periods of time. This can cause a battery of the PEV 220 to be drained because the PEV 220 may keep auxiliary loads (e.g., fans, blowers, etc.) enabled when an oscillating pwm signal produce by the pilot driver circuit 252 is electrically coupled to the PEV 220 via the second coupler 236. By employing the switch S6, the pilot driver circuit 252 can be switched off when a charge session is complete, thus ensuring that the PEV 220 battery is not drained.

Thus, the smart charging module 230 can detect an EVSE 210 coupling to the smart charging module 230, emulate a PEV 220 disconnect from the EVSE 210 via the switch S4, emulate an EVSE 210 disconnect from the PEV 220 via the switches S5, S8 and S6, detect if the PEV 220 has fallen asleep, and/or restart or otherwise reset the PEV 220 if it falls asleep.

The smart charging module 230 can also be configured to pair with the PEV 220, for example, a processor included in the PEV 220 to receive information on the battery included in the PEV 220. This can allow the smart charging module 230 to optimize the energy transfer from the EVSE 210 to the PEV 220 and ensure that the PEV 220 has sufficient charge when it is to be used by the user.

As described herein, the electric meter 250 can provide instantaneous power readings (kW) and amount of energy used since starting charge (kWh). To optimize energy transfer, the smart charging module 230 can also determine the amount of energy (kWh) needed for a charge session, the maximum rate of charge (kW), and minimum charge time needed (hours) at the maximum rate to achieve the energy needed. This information can be communicated to the external monitor (e.g., a smart phone app operated by a user, or any other external monitor described herein). In addition the user can further optimize the charge session by communicating the following information to the external monitor (e.g., a smart phone app operated by a user, or any other external monitor described herein), time charge is needed, target state of charge, and/or electric range needed. The external monitor can then communicate instructions to the processor 242 via the communications module 256 to control and optimize the charge session.

In some embodiments, the external monitor can include a cloud server. In such embodiments, the smart charging module 230 can be configured to communicate with the cloud server, for example, via a smart phone app. Furthermore, the cloud server can also be in communication with a telematics system's cloud server of the PEV 220 via a standard application programming interface (API). Thus, via the telematics system's cloud server API, the external monitor can receive the necessary information needed to provide optimized energy transfer.

In some embodiments, the user can utilize the external monitor, for example, a smart phone app, to input the PEV 220 current state of charge, target state of charge, time charge is needed, PEV 220 year, make and model or any other information pertaining to the PEV 220 into the external monitor. This information can be saved in a profile of the PEV 220. Multiple profiles can be created for a plurality of PEVs. The external monitor can utilize the manufacturer's specifications on the PEV 220 battery capacity (kWh) and onboard charger peak power (kW) with the other information to optimize the charge session and manage the grid. Moreover, the external monitor can have learning capabilities (e.g., learning algorithms) which can be used in combination with the information provided by the electric meter 250 to determine actual battery capacity of the PEV 220.

In some embodiments, the smart charging module 230 and/or the external monitor can be configured to communicate with an onboard diagnostics port (e.g., an OBD-II port) of the PEV 220 (e.g., a hybrid vehicle) via an OBD-II to wireless adapter to gain access to the controller area network of the PEV 220. Utilizing the OBD-II parameter IDs (PIDs) the smart charging module 230 and/or the external monitor can obtain the necessary information to perform optimized energy transfer.

Figure 3:
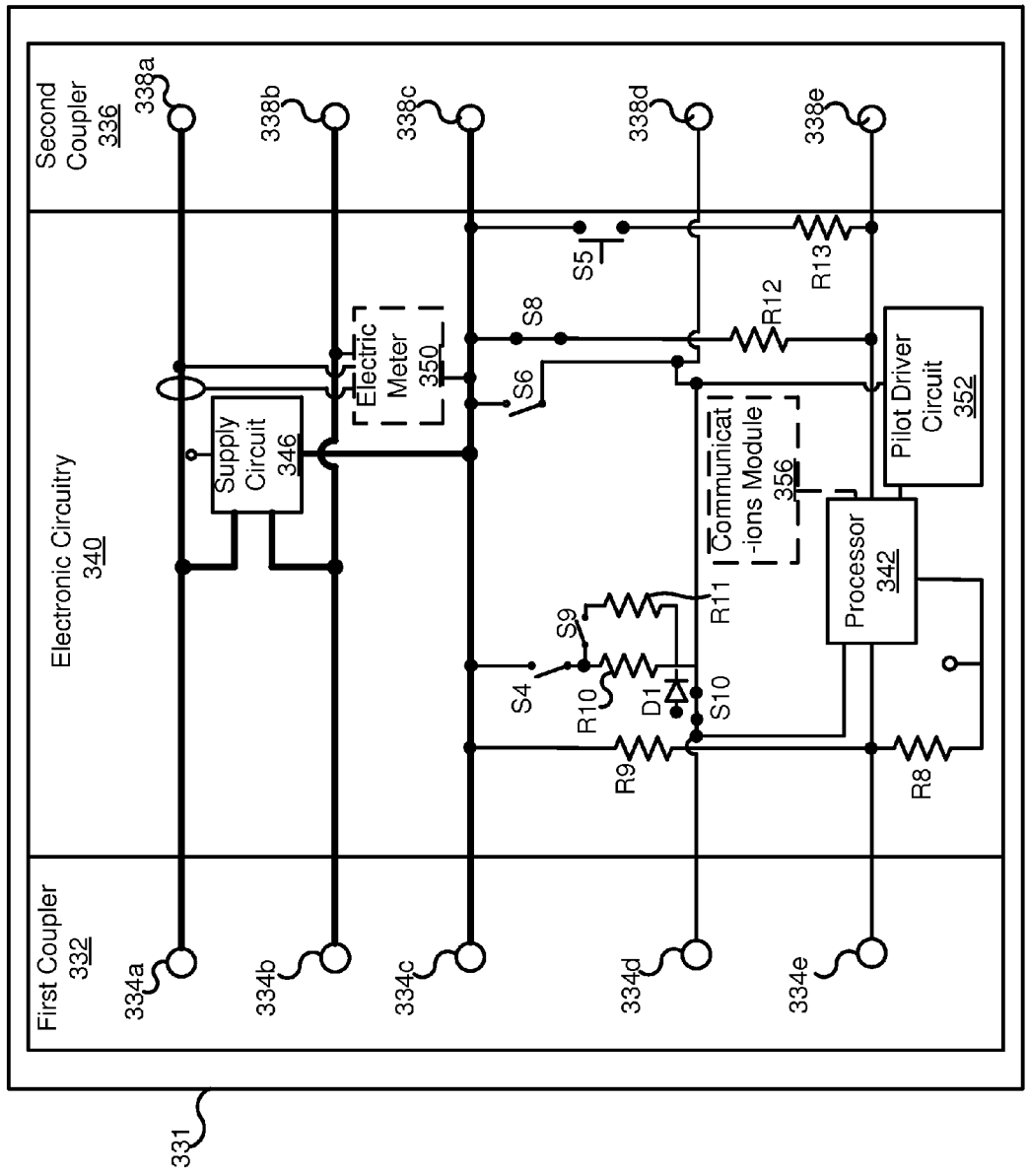
FIG. 3 shows a block diagram of a smart charging module showing a circuit diagram of an electronic circuitry included in the smart charging module which does not include a power source, according to another embodiment.

In some embodiments, a smart charging module for a PEV does not include a power source. FIG. 3 is a block diagram of a smart charging module 330 showing a circuit diagram of the electronic components included in the smart charging module 330. The smart charging module 330 can be included in a smart charging system, for example, the smart charging system 100. The smart charging module 330 includes a first coupler 332, a second coupler 336, and an electronic circuitry 340. The smart charging module 330 is configured to be a standalone module which can be removably coupled to an EVSE (e.g., the EVSE 110 or 210) and a PEV (e.g., the PEV 120 or 220) to provide smart charging capabilities, as described herein.

The smart charging module 330 includes a housing 331 defining an internal volume. The first coupler 332, the second coupler 336, and the electronic circuitry 340 are disposed within the internal volume defined by the housing 331. The housing 331 can be substantially similar to the housing 231 included in the smart charging module 230 and therefore, not described in further detail herein.

The first coupler 332 is configured to be removably coupled to the EVSE. The first coupler 332 includes a first pin 334a, a second pin 334b, a third pin 334c, a fourth pin 334d, and a fifth pin 334e (collectively referred to herein as the "first coupler pins 334"). The second coupler 336 is configured to removably coupled to the PEV and includes a first pin 338a, a second pin 338b, a third pin 338c, a fourth pin 338d, and a fifth pin 338e (collectively referred to herein as the "second coupler pins 338"). The first coupler 332 and the second coupler 336 can be substantially similar to the first coupler 232 and the second coupler 236 described with respect to the smart charging module 230 and therefore, not described in further detail herein.

The electronic circuitry 340 includes a processor 342, a pilot driver circuit 352, optionally an electric meter 350, and optionally, a communications module 356. These components can be substantially similar to the processor 242, the pilot driver circuit 252, the electric meter 250, and the communications module 256, respectively described with respect to the smart charging module 230 and therefore, not described in further detail herein.

The smart charging module 330 includes a supply circuit 346 but does not include a power source. The supply circuit 346 is configured to supply the electrical power received from the EVSE to the components of the electronic circuitry 340. However, without the power source, the smart charging module 330 is only functional when coupled with the EVSE and the PEV and therefore, cannot provide updates or communication capabilities unless coupled with the EVSE and/or the PEV and charging.

The electronic circuit 340 includes a single pole double throw relay S10. The relay S10 is configured to transmit a pwm signal on the fourth pin 334d of the first coupler 332 through the electronic circuitry 340 to allow the PEV to start the charging session. Once the PEV starts the charging session, the EVSE can close its contactors to apply an AC voltage across the first pin 334a and the second pin 334b included in the first coupler 332. The presence of the voltage between the first pin 334a and the second pin 334b powers on the smart charging module 330. The smart charge module can then measure or otherwise monitor the communicated pwm duty cycle provided by the EVSE. The processor 342 and the pilot driver circuit 352 can then coordinate with high precision and timing the opening of relay S10 to emulate PEV circuitry via the diode D1, the resistors R10 and R11, and the switches S4 and S9. Simultaneously, the electronic circuitry 340 can provide an emulated pwm signal to the PEV via pilot driver circuit 352. Once this occurs, the smart charging module 330 can be in control of the charging session.

Figure 4:
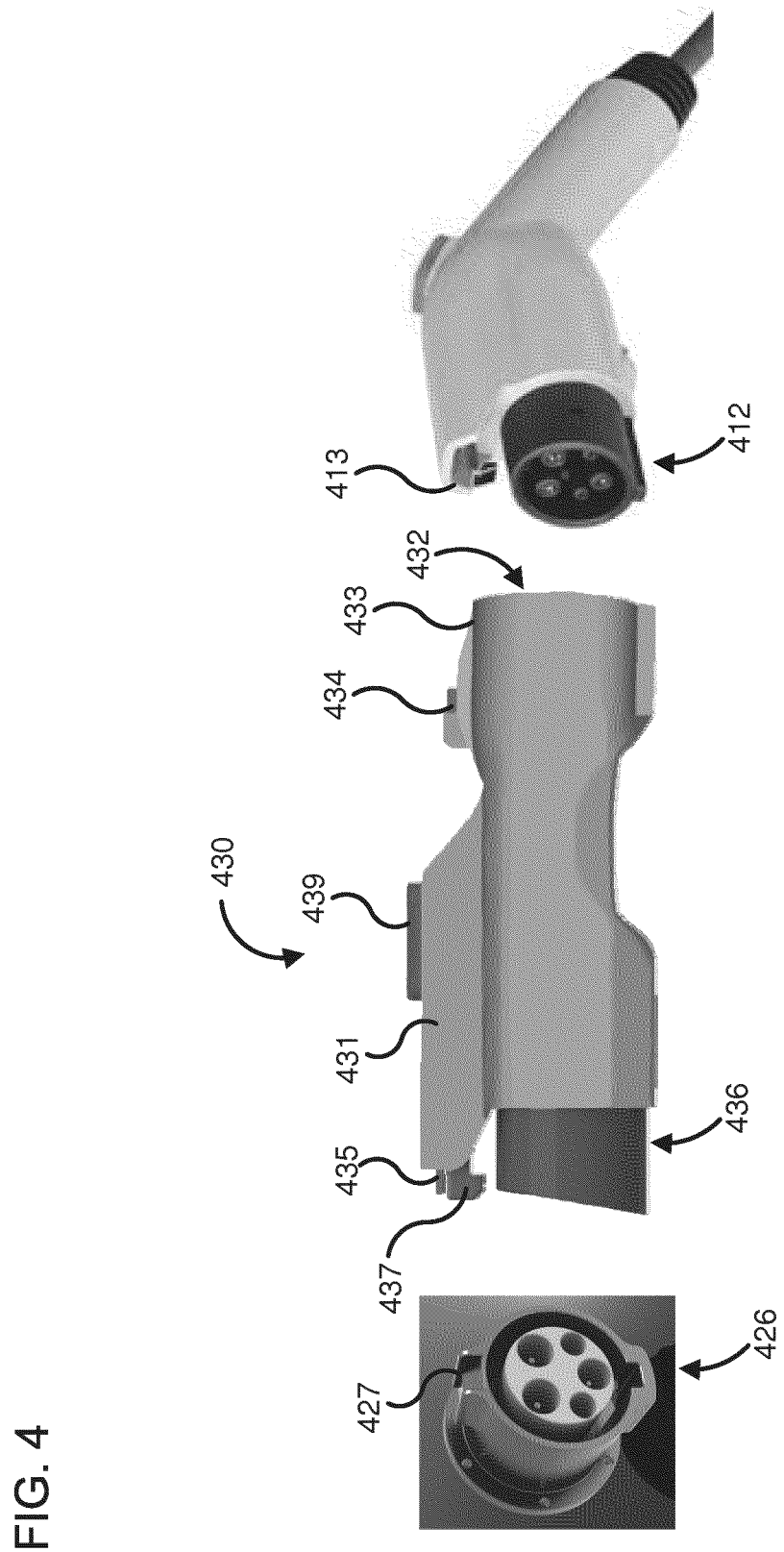
FIG. 4 shows a side view of a smart charging module that includes a first coupler and configured to be coupled to an EVSE, and a second coupler configured to be coupled to a PEV, according to an embodiment.

FIG. 4 shows a side view of a smart charging module 430 for providing smart charging capabilities to a PEV. The smart charging module 430 includes a housing 431 that defines an internal volume. The smart charging module 430 includes a first coupler 432, a second coupler 436, and electronic circuitry disposed within the internal volume defined by the housing 431. The electronic circuitry can be substantially similar to the electronic circuitry 140, 240, 340, or any other electronic circuitry described herein, and therefore not described in further detail herein.

The first coupler 432, the second coupler 436, and the electronic circuitry 440 are disposed within the internal volume defined by the housing 431. The housing 431 can be made from a strong and rigid material, for example, plastics or metals. The housing 431 has a substantially cylindrical shape and can include grooves, ridges, ribs, indents, and/or detents on an outer surface of the housing 431, for example, to facilitate gripping of the housing 431 by a user.

The first coupler 432 includes a female SAE J1772™ coupler which is structured to be coupled to a male coupler 412 of an EVSE (e.g., the EVSE 110 or any other EVSE described herein). The housing 431 includes a notch 433 configured to engage a latch 413 included in the male coupler 412 and locked in place by pin 434. Pin 434 can be manually or electronically controlled to lock/unlock male coupler 412 from the first coupler 432. Thus, the latch 413 and pin 434 can be used to retrofit the smart charging module 430 to the EVSE to provide smart charging capabilities to a conventional EVSE.

The second coupler 436 includes a male SAE J1772™ coupler which is structured to be coupled to a female SAE J1772™ coupler 426 of a PEV (e.g., the PEV 120 or any other PEV described herein). A latch 437 is included in the smart charging module 430. The latch 437 is configured to engage a corresponding notch 427 included in the female coupler 426 and locked in place by pin 435. Pin 435 can be manually or electronically controlled to lock/unlock male coupler 436 from the PEV female coupler 426. An uncoupling mechanism 439, for example, a push button, a sliding lever, or any other suitable uncoupling mechanism is also included in the smart charging module 430. The uncoupling mechanism can be engaged by the user to disengage the latch 437 from the notch 427, thus allowing uncoupling of the smart charging module 430 from the PEV, for example, after pin 435 has been disengaged to unlock the male coupler 436 from the PEV male coupler 426.

In other embodiments, the male coupler 412 of the EVSE and the female coupler 426 of the PEV can include any coupler other than a SAE J1772™ coupler, for example, any other coupler described herein. In such embodiments, the first coupler 432 and the second coupler 436 of the smart charging module 430 can include any suitable coupler which is structured to mate with the corresponding couplers 412 and 426 of the EVSE and the PEV, respectively.

FIG. 5 shows a schematic flow diagram of a method 500 of charging a PEV, for example, the PEV 120, 220, 320, or any other PEV described herein. The method 500 includes coupling a smart charging module with an EVSE (e.g., the EVSE 110, 210, 310, or any other EVSE described herein), at 502. The smart charging module can include the smart charging module 130, 230, 330, or any other smart charging module described herein. The smart charging module is coupled to the PEV, at 504. For example, the smart charging module can include a first coupler (e.g., a female SAE J1772™ coupler) structured to be coupled to a coupler (e.g., a male SAE J1772™ coupler) of the EVSE. Furthermore, the smart charging module can include a second coupler (e.g., a male SAE J1772™ coupler) configured to be coupled to a coupler of the PEV (e.g., a female SAE J1772™ coupler). Moreover, the smart charging module can be coupled to the PEV and the EVSE in any order.

In some embodiments, the method 500 can include emulating a pulse width modulated (pwm) signal generated by the EVSE, at 506. For example, the smart charging module can include a pilot driver circuit and electronic circuitry configured to emulate the pwm signal of the EVSE such that the PEV believes that it is directly coupled to the EVSE (e.g., as described with respect to the smart charging module 130 and 230).

Electrical power is provided from the PEV to the EVSE through the smart charging module, at 508. A charge parameter of the PEV is measured, at 510. The charge parameter can include a charge status, a charge parameter, a physical connectivity status, or any other suitable charging parameter of the PEV. For example, the smart charging module can include a processor and/or an electric meter configured to measure the one or more charging parameters of the PEV.

In some embodiments, the charging parameter can be communicated to a monitor, at 512. For example, the smart charging module can include a communications module (e.g., the communications module 256 or 356, as described herein) configured to communicate the one or more charge parameters to an external monitor. The monitor can include a smart phone app, a tablet app, a remote server, a cloud server, a remote computer, an onboard computer, or any other external monitor as described with respect to the system 100, or the smart charging modules 230 or 330.

The charging parameter is controlled, at 514. For example, the monitor can be configured to analyze the charging parameter and communicate instructions to a processor included in the electronic circuitry of the smart charging module via the communications module. The instructions can relay information on controlling the charging parameter, for example, increase or reduce the charge rate, or stop/start the charging session.

In some embodiments, the method 500 can optionally determine if a charge module (e.g., a charge module onboard state machine) of the PEV needs to be reset. For example, the smart charging module can be configured to monitor the charging parameter and receive feedback from the PEV to determine if the charge module needs to be reset. If the charge module does not need to be reset the method 300 returns to operation 508 to continue charging the PEV. If a reset of the charge module is needed, the method further includes emulating an unplug-replug event without physically uncoupling the smart charging module from either of the EVSE or the PEV.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or movable (e.g., removable or releasable). Such joining may be achieved with the two members and any additional intermediate members being integrally formed as a single unitary body with one another or with the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A smart charging system for metering, monitoring, and control of a plug in electric (PEV) vehicle, comprising:
   an electric vehicle supply equipment (EVSE) configured to supply electrical power to the PEV; and
   a smart charging module electrically coupled between the EVSE and PEV, the smart charging module comprising an electronic circuitry;
   the electronic circuitry including a processor, the electronic circuitry electrically coupled to the EVSE and PEV, the electronic circuitry configured to pass electrical power from the EVSE to the PEV, the electronic circuitry configured to measure a charging parameter of the PEV, the electronic circuitry further structured to control the charge rate of the PEV by manipulating the control pilot and proximity signals to emulate a PEV to the EVSE, and emulate an EVSE to the PEV.

2. The system of claim 1, wherein the smart charging module further comprises:
   a first coupler structured to be removably coupled to the EVSE.

3. The system of claim 2, wherein the smart charging module further comprises:
   a second coupler structured to be removable coupled to the PEV.

4. The system of claim 3, wherein each of the first coupler and the second coupler include a SAE J1772™ coupler.

5. The system of claim 1, wherein the charging parameter includes at least one of a charging status and a charge rate the electronic circuitry further configured to perform at least one of an increase, or reduction of the charge rate.

6. The system of claim 1, wherein the smart charging module further comprises:
   a communication module in two way communication with the processor and an external monitor, the communications module configured to communicate the charging parameter to the external monitor.

7. The system of claim 6, wherein the monitor is configured to communicate instructions to the processor via the communications module to control the charging parameter.

8. The system of claim 1, wherein the smart charging module further comprises:
   an electric meter for measuring electrical power and electrical energy supplied to and from the PEV via the smart charging module.

9. The system of claim 8, wherein the electronic circuitry is structured to incorporate transaction control in the EVSE to allow credit card or contract payment transactions to be performed via the system.

10. The system of claim 1, wherein the electronic circuitry is structured to emulate an unplug-replug event without physically uncoupling the smart charging module from either of the EVSE or the PEV.

11. A smart charging module for a plug in electric vehicle (PEV), comprising:
    a first coupler structured to be removably coupled to an electric vehicle supply equipment (EVSE);
    a second coupler structured to be removably coupled to the PEV; and
    an electronic circuitry electrically coupled to the first coupler and the second coupler, the electronic circuitry including a processor, the electronic circuitry configured to pass electrical power from the EVSE, via the first coupler, to the PEV, via the second coupler, the electronic circuitry configured to measure a charging parameter of a charge session of the PEV.

12. The smart charging module of claim 11, wherein the charging parameter includes at least one of a charging status and a charge rate the electronic circuitry further configured to perform at least one of an increase, or reduction of the charge rate.

13. The smart charging module of claim 11, wherein each of the first coupler includes a female SAE J1772™ coupler and the second coupler includes a male SAE J1772™ coupler.

14. The smart charging module of claim 11, further comprising:
    a communications module configured to allow two way communications between the processor and an external monitor.

15. The smart charging module of claim 14, wherein the external monitor is configured to control the charging parameter of the PEV.

16. The smart charging module of claim 11, further comprising:
    an electric meter for measuring electrical power and electrical energy supplied to and from the PEV via the smart charging module.

17. The smart charging module of claim 11, further comprising:
    a rechargeable power source configured to be charged by the EVSE and provide power to the electronic circuitry when the smart charging module is uncoupled from the EVSE.

18. The smart charging module of claim 11, wherein the electronic circuitry further comprises:
    a pilot driver circuit structured to emulate a pulse width module signal generated by the EVSE.

19. The smart charging module of claim 11, wherein the electronic circuitry is structured to emulate an unplug-replug event without physically uncoupling the smart charging module from either of the EVSE or the PEV.

20. A method for charging a PEV, comprising:
    coupling a smart charging module with an EVSE;
    coupling the smart charging module to the PEV;
    providing electrical power from the EVSE to the PEV through the smart charging module;
    measuring a charging parameter of the PEV; and
    controlling the charging parameter.

21. The method of claim 20, further comprising:
    emulating a pulse width modulated signal generated by the EVSE.

22. The method of claim 20, further comprising;
emulating an unplug-replug event without physically uncoupling the smart charging module from either of the EVSE or the PEV to reset the PEV.

* * * * *